United States Patent [19]

Barabas et al.

[11] 4,234,782
[45] Nov. 18, 1980

[54] SPACE HEATING USING OFF-PEAK ELECTRIC HEAT STORAGE

[75] Inventors: Miklos F. Barabas; William B. Cooke; R. H. Stephen Hardy; Arun Verma, all of Regina, Canada

[73] Assignee: Saskatchewan Power Corporation, Regina, Canada

[21] Appl. No.: 870,711

[22] Filed: Jan. 19, 1978

Related U.S. Application Data

[63] Continuation of Ser. No. 567,104, Apr. 11, 1975, abandoned.

[51] Int. Cl.³ .......................... H05B 1/02; F24H 7/04
[52] U.S. Cl. ..................... 219/365; 126/400; 165/18; 165/103; 165/104 S; 219/364; 219/367; 219/378; 219/491
[58] Field of Search ............... 219/341, 378, 365, 530, 540, 325, 326, 364, 366, 367, 491–493; 165/104 R, 104 S, 18; 126/400

[56] References Cited

U.S. PATENT DOCUMENTS

| | | | |
|---|---|---|---|
| 3,569,669 | 2/1969 | March | 219/378 |
| 3,958,101 | 5/1976 | Barabas | 219/378 X |
| 3,989,927 | 11/1976 | ERB | 219/378 |

FOREIGN PATENT DOCUMENTS

| | | | |
|---|---|---|---|
| 188815 | 2/1957 | Austria | 219/378 |
| 6579973 | 2/1963 | Canada | 219/365 |
| 2129850 | 12/1972 | Fed. Rep. of Germany | 219/378 |
| 1017665 | 1/1966 | United Kingdom | 219/365 |
| 1160081 | 7/1969 | United Kingdom | 219/378 |
| 1205755 | 9/1970 | United Kingdom | 219/365 |

Primary Examiner—A. Bartis
Attorney, Agent, or Firm—Burns, Doane, Swecker & Mathis

[57] ABSTRACT

An off-peak, electric, central air heating system for buildings incorporating a heat storage material that is used to store heat generated electrically during off-peak electrical power periods and to deliver heat on demand. The heat storage material is an alkaline metal or alkaline earth metal salt such as $Na_2SO_4$, $NaCl$, $CaCl_2$ and $KCl$ individually or in combination with one another. Generation of heat during the off-peak electrical power periods is automatically controlled by an electronic time clock and time delay circuitry, and by selective variable temperature control. The heating unit is constructed with a casing having an inner jacket and an outer jacket with an air space between the two jackets. The storage material is surrounded by the inner jacket and the air space provides insulation as well as an air passage between the two jackets. The transfer of heat from the heat storage tank into the building at desired temperature is achieved by a proportional air flow control device and a two speed fan. When air is directed only through the space between the two jackets, the fan runs at low speed. When air is directed through the inner jacket containing the heat storage material, the fan runs at high speed. Also disclosed are emergency override as well as other control circuits that operate on timed as well as temperature bases to insure proper heating of the space.

11 Claims, 19 Drawing Figures

ENLARGED SECTION A-A

FIG 4

FIG 5  Section B-B  FIG 6

FIG 7

FIG 8
Section C-C

FIG 9

Section D-D
FIG 10  FIG 11

SPACE HEATING USING OFF-PEAK ELECTRIC HEAT STORAGE

RELATED APPLICATIONS

This is a continuation of United States Patent Application Ser. No. 567,104 filed Apr. 11, 1975, now abandoned.

This invention consists of an off-peak electrical heating system, and more particularly a heating system which utilizes heat that is generated electrically and stored in a heat storage medium during the off-peak hours of electricity demand.

This heating system can be used to heat a conventional home in the same manner as a conventional natural gas or oil furnace, or a central electrical heating system.

BACKGROUND OF THE INVENTION

Increased prices of conventional heating fuels and predicted shortages have prompted the adoption of electric heating in many homes. Since the energy to heat a house exceeds the electrical energy normally supplied to the home in many areas of North America, total conversion to electric heat would necessitate tremendous increases in the electrical generating and transmission capacity of the utility companies. This situation can be alleviated by the use of off-peak electricity and heat storage for home heating, but units suited to the extreme North American requirements do not exist. The inventors have invented an efficient off-peak, electrical central air heating system for buildings that uses heat that is generated electrically during the off-peak power periods and stores the generated heat in a heat storage material for use during the peak power periods.

SUMMARY OF THE INVENTION

The basic principles of the off-peak electrical heating system is the storage during off-peak electrical power periods of heat in a suitable heat storage material. The stored heat is withdrawn from the storage material on a "heat-on-demand" basis, thus relieving the electrical power system of heavy heating loads during peak hours. Operation in this manner leads to more effective utilization of the generation, transmission and distribution facilities of the electrical power system.

Suitable materials for heat storage are inexpensive alkaline metal or alkaline earth metal salts such as sodium sulphate ($Na_2SO_4$), sodium chloride (NaCl), potassium chloride (KCl), and calcium chloride ($CaCl_2$), individually or in combination with one another. These salts, or salt mixtures, can be cast or molded into blocks. Binding agents such as silicates, silica, Kaolin, clay or fly ash can be used to stabilize the heat storage material and grain size can be controlled by temperature control and additives.

Electrical heating elements, which are used in generating and transmitting heat to the heat storage material are embedded in the material while the material is being cast or molded, or are wrapped around the circumference of the material, or are stacked with the material.

The heating system is designed to operate over heat storage material temperatures ranging from about room temperature to about 1200° F.

The surfaces of the blocks may be sealed with a suitable sealing medium to prevent the transmission of obnoxious odors into and out of the blocks, or water vapour into the blocks. The electrical heating elements may be coated with a corrosion protective material to prevent corrosion of the heating element by the heat storage material. Such coating can also act as an electrical insulating material.

The heating system may be of an open loop type wherein the cold air to be heated is separated into two portions, one portion then being heated by the heat stored in the material before being mixed with the other unheated portion to provide a blend of warm air. A proportional air flow control can be used to regulate the relative proportions of cold and heated air thereby providing control over the temperature of the blended air being delivered to the heated space.

The heating system may also be of a closed loop type wherein cold air to be heated is passed through a heat exchanger wherein the cold air is heated by an exchange of heat with air that has been heated by the heat stored in the heat storage material.

Transmission of electrical power to the heat storage material is controlled by a rechargeable battery fed electronic timer and clock that regulates the period of time that power is drawn to generate heat for storage in the heat storage material and to heat the building during the period of power drawn. The maximum amount of heat that can be stored in the heat storage material is controlled by a temperature control that can be selectively adjusted by the user. A timer by-pass control permits a reduced capacity supply of electrical power to be drawn for heating when insufficient heat is stored in the blocks.

The external type heating element is constructed so that it has a built-in safety feature. It will be appreciated that if the timer control becomes defective, and electrical power continues to be delivered to the heating element beyond the normal heating cycle, a dangerous situation could develop because high temperatures would be reached, the heat storage material would melt, and damage to the furnace could result. Accordingly, the heating coil is designed so that it will self-destruct itself at a temperaure of 1500°.

The heat tank consists of a unique double jacket design. The heat storage material and the heating elements are enclosed in an inner heat tank casing which is insulated with high temperature insulation. The inner heat tank casing and high temperature insulation are enclosed in a second exterior furnace casing that is insulated with low temperature insulation. An air passage exists between the heat tank casing and high temperature insulation and the exterior furnace casing and low temperature insulation. Low speed air is constantly circulated through the air passage to pick up any casual heat that is radiated through the inner heat tank casing and the high temperature insulation. In this way, virtually all the heat stored in the heat storage material is utilized to heat the building.

When additional heat for the building is required, a control gate, which controls the proportion of the air that is circulated through the air space between the heat tank and the furnace casing and the air that is circulated through the interior of the tank casing to pick up heat from the heat storage material, opens a required amount to permit more air to be circulated to the interior of the heat tank casing so as to pick up more heat. The blend of these two separate circulated air systems is proportionally controlled so that the desired temperature of heated air is delivered to the building.

The temperature that is to be maintained in the building is controlled by a thermostat that can be selectively set by the user. The thermostat regulates the operation of the furnace fan motor and the control gate motor. When the thermostat demands heat, the furnace fan motor switches to high speed and the control gate is operative. Otherwise the fan operates at low speed and the control gate is closed to airflow through the heat tank.

DESCRIPTION OF THE INVENTION

Selection of a suitable heat storage material is an important feature of this invention. Suitable heat storage materials will have the ability to store (1) a maximum amount of heat within (2) a minimum volume over (3) a minimum temperature rise, with (4) the material being always in solid phase.

Countries like Canada, which experience very low climatic temperatures in the winter, for efficiency reasons, cannot rely on large volume heat storage materials because in order to provide sufficient capacity large and bulky storage units are required. Furthermore, the heat storage material must meet such practical requirements as low cost, ready availability and ease of handling.

Among the materials which meet these requirements, but which, as far as is known, have not been applied to a system that can heat an entire house in the extreme cold climate regions of the northern hemisphere, are a variety of salts, and mixtures of these salts, heated to high temperatures in the regiion of 1200° F. The density and thermal heat storage capacity of these salts in their natural form is low, but the heat storage capacity is considerably improved if the salts are in the form of solid blocks.

Figure 1:
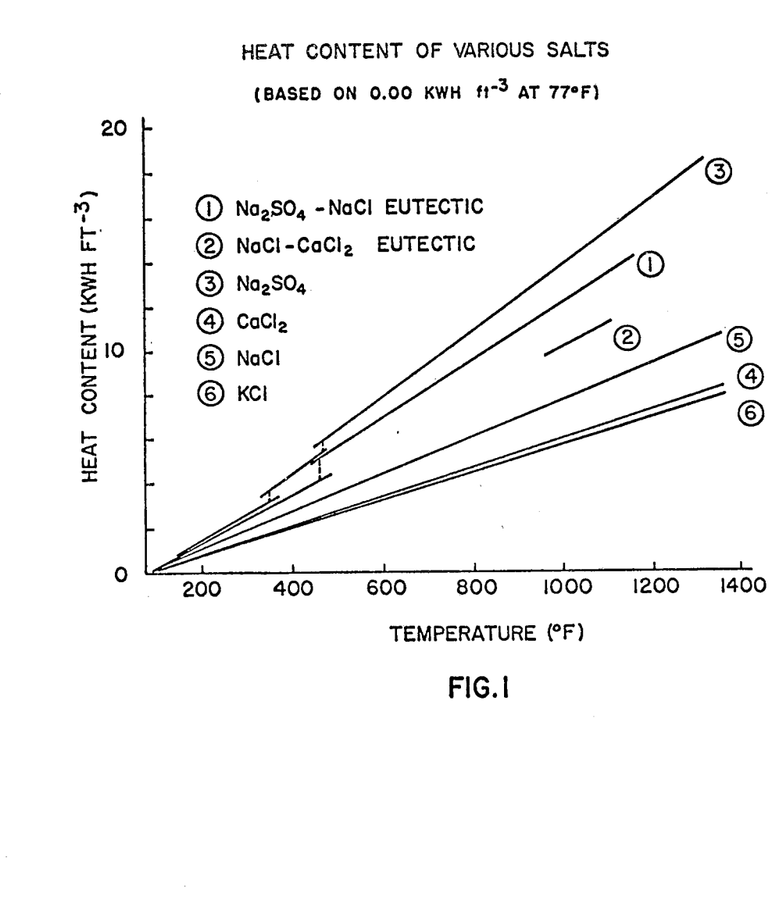
FIG. 1 is a graph showing heat content per unit volume as a function of temperature for various heat storage materials.

A graphic plotting of heat content per unit volume as a function of temperature for various salts, and salt mixtures, provides a useful means of evaluating potential heat storage materials (see FIG. 1). The slope of the line indicates heat content per unit volume per degree of temperature. Generally, the steeper the line, the more satisfactory the material. Materials having maximum heat capacity per unit of volume per unit of temperature can therefore be readily identified.

The applicant's heat storage system is intended to operate with heat storage material temperatures ranging from about room temperature to about 1200° F. It has been found that over this wide range of temperatures, the blocks tend to disintegrate and crumble with time. This is undesirable because the blocks lose much of their heat storing ability. It has been found that the stresses in the block can be reduced by addition of other salts. It has also been found that artificial binding agents can be used to strengthen the block structure. Silicates, silica, Kaolin, clay, fly ash, and similar materials, have been found to be useful as binding agents. The binding agent is believed to matricize the salt and thus the salt block resists thermal cracking due to expansion and contraction in the operating temperature range of about room temperature to about 1200° F. Grain size control through process temperature control and grain refinement additives are also important.

Suitability of the heat storage material must also be considered from the standpoint of casting temperatures and maximum system design temperature. Each salt has a certain melting point, and mixtures of salts have different melting points than the pure salts.

Salts, and mixtures of salts, which have very high melting points are not generally satisfactory because of the difficulty in casting blocks from such salts and salt mixtures. On the other hand, salts, and mixtures of salts, which have low melting points are not generally satisfactory because they might melt during peak block operating temperatures of the heating system.

A block of heat storage material can be constructed by casting or molding. Casting is done by melting the salt or salt mixture and then solidifying the salt or salt mixture into blocks. However, casting is not recommended for blocks that are intended to be operated frequently at temperatures of 1200° F. It has been found that a cast block is somewhat brittle and will tend to crack. On the other hand, casting is advantageous because it provides an easy method of embedding the element in the salt.

Because salts are electrically low conductive materials in the solid state, casting is recommended for low voltage type heating elements (20 to 25 volts) since better adhesion and thus heat transmission are obtained. A spray on or dip coating of electrical insulating material such as MgO or the like is recommended to increase heat transmission between the salt and the element. MgO is also advantageous because it acts as a corrosion protection material. Other suitable coating materials can also be used.

Figure 2:
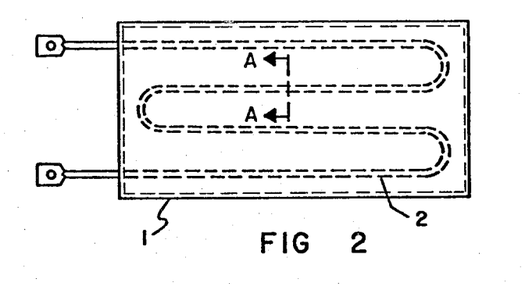
FIG. 2 is an elevational view of an internal type heating element embedded in heat storage material.
Figure 3:
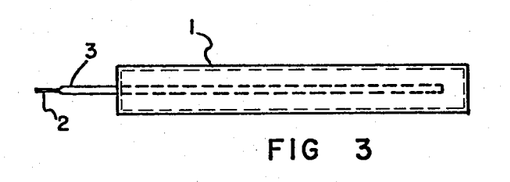
FIG. 3 is a side view of the heat storage element and heat storage material shown in FIG. 2.
Figure 4:
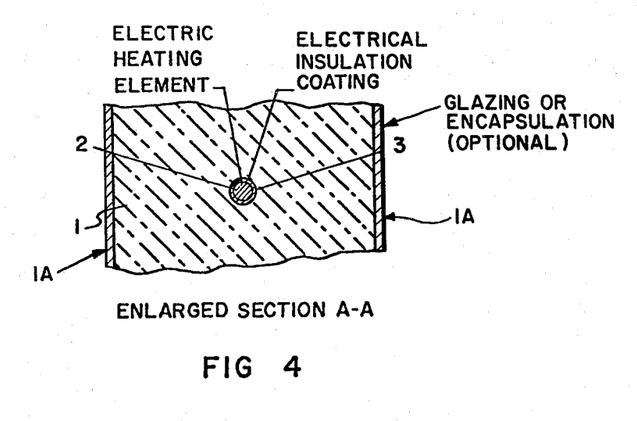
FIG. 4 is an enlarged sectional view taken along Section A—A of FIG. 2.

FIGS. 2 and 3 show a typical cast type heat storage block comprising heat storage material 1 and internal heating element 2. FIG. 4 shows in sectional manner the heat storage material 1 casted on the internal heating element 2 which is coated by insulating material 3.

In order to construct a heat storage block by molding, the selected salt, or salt mixture, along with an inorganic binding agent such as silicate, Kaolin, clay, fly ash or similar material, is wetted by 5 to 10 percent of an organic liquid binder, such as latex, and is compressed at pressures of 10,000 psi or more into the desired block form. The block is then dried and prebaked at about 500° F. temperature. Once the block has cooled down to about room temperature, it is baked again at 1200° F. temperature. These temperatures represent the limits of the temperature cycle over which the block will be operated during the heat storage process.

A third method of forming the salt blocks is by sintering the salt or mixtures of the salt at temperatures below 1200° F. The shape of the block chosen depends usually on the particular construction of the overall heating system. However, as a general rule, a slab shape rather than a plate shape is preferred in order to equalize the heat stresses which occur in the block at the high operating temperatures.

The blocks can also be formed with interlocking endentments to provide air space and heater space when stacked, though the same purpose can be achieved using spacers made of metal or some other suitable material.

Figures 5, 6, 7:
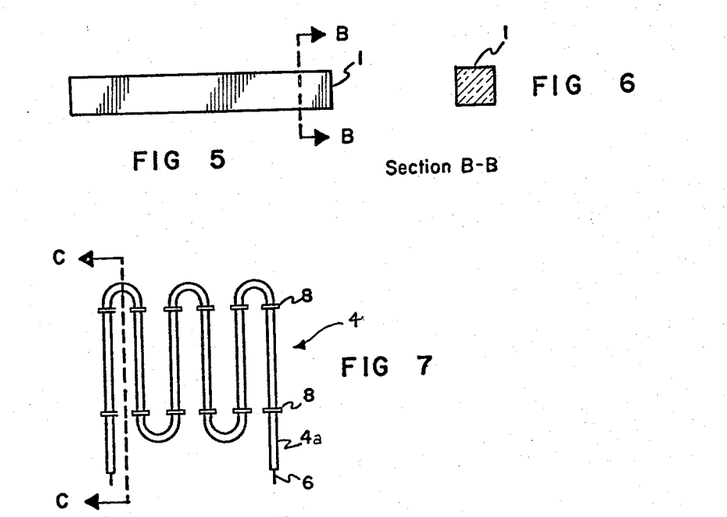
FIG. 5 is an elevational view of the heat storage material used in association with an external type heating element.
FIG. 6 is a sectional view taken along Section B—B of FIG. 5.
FIG. 7 is an elevational view of an external type electrical heating element.
Figure 8:
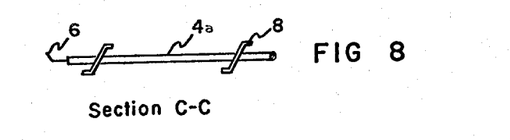
FIG. 8 is a sectional view taken along Section C—C of FIG. 7.

A typical slab for use in association with an external type heating element is shown in FIGS. 5 and 6. A row of slabs is used to create a heat storage block. A vertical column of heat storage blocks is used to create the total desired heat storage mass.

FIGS. 7 to 11 inclusive illustrate the construction of the external type heating element 4. Essentially it is a radiant type tube heater which has a high temperature sheathing 4a, such as a nickel alloy. A special feature of the heater 4 is the long electrical lead 6 which is constructed of a high electro-conductive material. Very little heat is generated over this distance thereby creating a cold lead out of the heat tank 9 through insulation 21.

The heating element is so designed that if something goes wrong and power continues to be fed to the heating element, the heating element will burn out once a sheath material 4 temperature of 1500° F. is reached. This self destructing safety feature protects the heat tank 9 because the element burns out before the melting point of the heat storage material 1 is reached.

Figure 9:
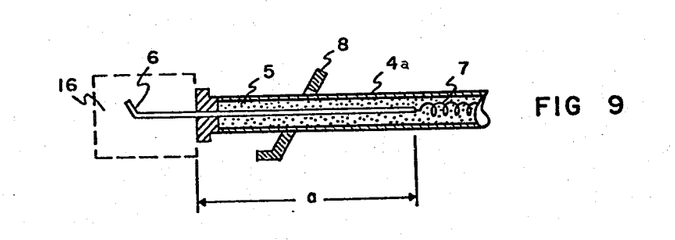
FIG. 9 is an enlarged partially cut away view of FIG. 8 showing details of construction of the external type heating element.

As may be seen in FIG. 7, the heating element 4 is constructed to traverse back and forth several times to increase its heat generating ability over a given area. FIG. 9 shows the constructional details of the heating element 4. The electrical lead 6 and the heating coil 7 are encased in a compressed and vitrified ceramic insulating material 5. The distance "a" of the "cold" electrical lead 6 corresponds to the thickness of insulation 21, air passage 22 and insulation 23 in FIG. 14.

The heating element 4 is maintained in spaced relation with the heat storage material 1 when in stacked relationship with one another by means of stands 8 located at various positions on the overall heating element 4 (See FIG. 7). These stands are constructed of a suitable metal and slide onto the heating element 4.

Figure 10:
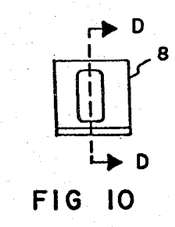
FIG. 10 is an elevational view of an external type heating element stand.
Figure 11:
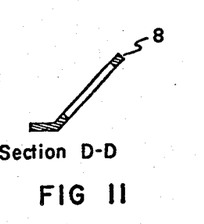
FIG. 11 is a sectional view taken along Section D—D of FIG. 10.

FIG. 10 shows in detail the construction of the slip on stand 8 in elevation while FIG. 11 the cross section detail.

Figure 12:
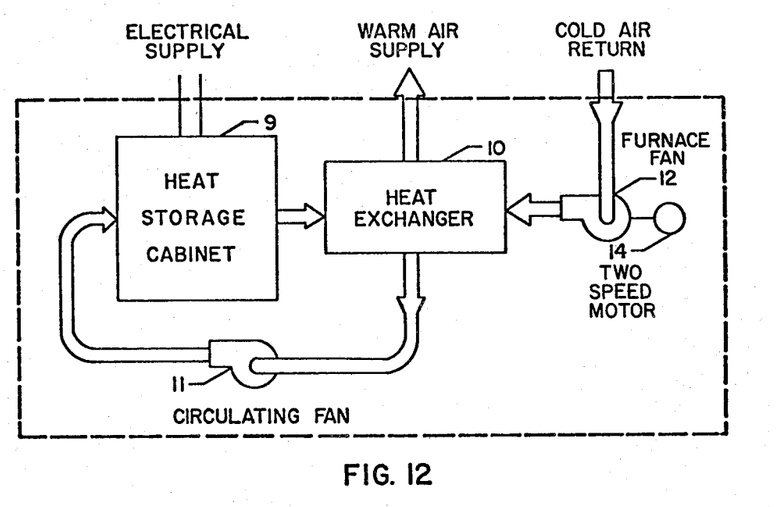
FIG. 12 is a diagrammatic representation of a closed loop heating system.
Figure 13:
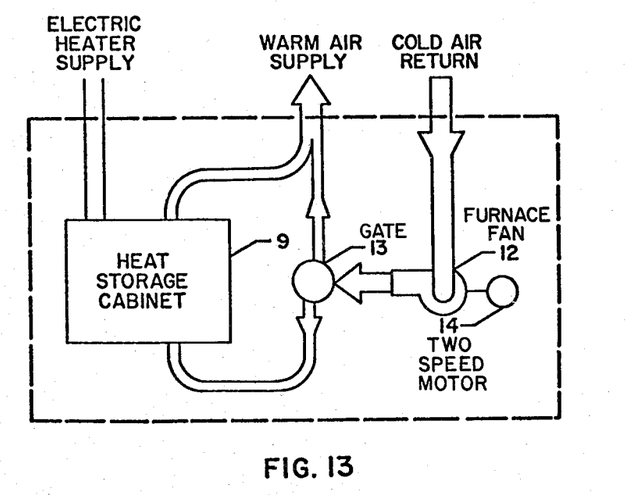
FIG. 13 is a diagrammatic representation of an open loop heating system.

FIGS. 12 and 13 show diagrammatic concept of the overall heat storage system. The heat storage materials 1 and heating elements are grouped together and insulated to provide a heat storage cabinet (heat tank) 9. The amount and number of heat storage materials and heating elements are variable depending on the heat storage capacity that is required.

FIG. 12 shows a closed loop system, in which heated air is circulated from a heat storage cabinet 9 to a heat exchanger 10 by means of a circulating fan 11. The heat exchanger 10 transfers some of the heat from the heated air from the heat storage cabinet 9 to the cold air that is drawn from the space to be heated through the cold air return by means of the furnace fan 12. The warmed air is circulated back to the heated spaced as in a conventional forced air central heating system through the warm air supply.

FIG. 13 shows an open loop system where a controlled portion of the cold return air from the space being heated passes through the heat storage cabinet 9 and picks up heat. It is then mixed with the remaining portion of the unheated air to provide warm air to the space being heated at the required temperture. The ratio of warmed air to cold air to provide air of the required temperature is controlled by control gate 13.

One factor for making a choice between the open loop and closed loop systems depends on whether the heat storage material tends to trap and subsequently release odors. Certain materials will trap odors as they cool and then release them during a warmup period. Such materials would normally require the closed loop design to avoid odors being circulated throughout the space being heated, such as a house.

Alternatively, the surface of the heat storage material 1 can be sealed by encapsulation, or by glazing 1A to prevent the transmission of odors into and out of the heat storage material 1, if this provides a cheaper system with equally satisfactory operation.

Figure 14:
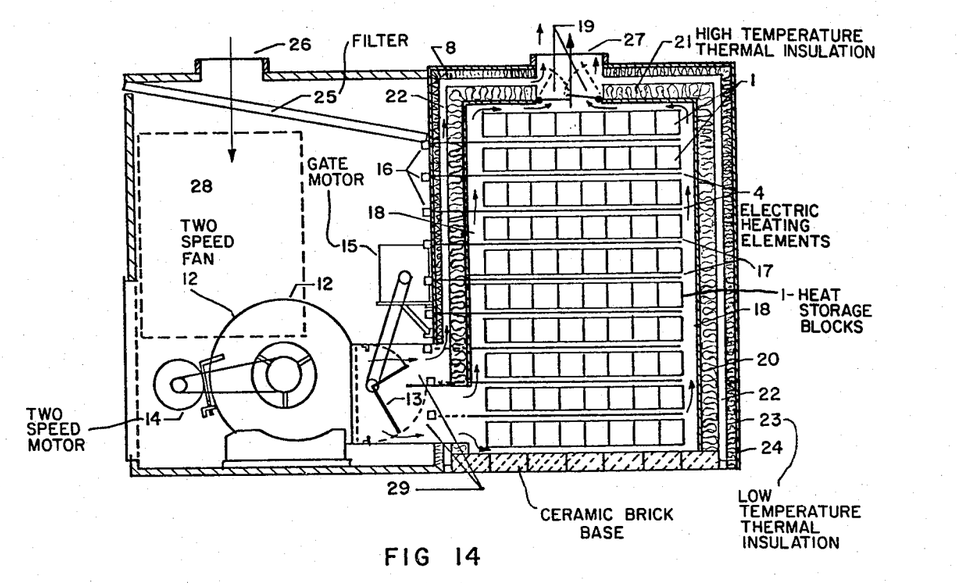
FIG. 14 is a partially cut away side view of a heating system using external type heating elements.
Figure 15:
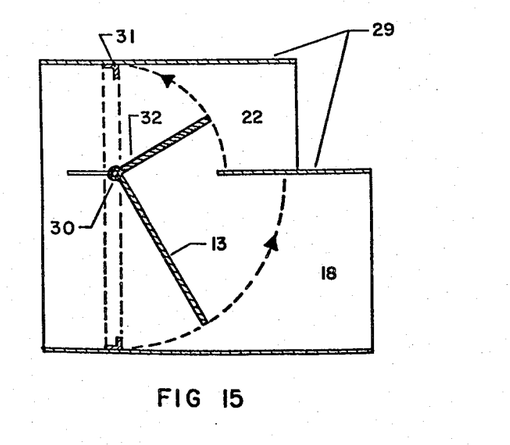
FIG. 15 is an enlarged view of a split cold air duct with the control gate in half-open position.

FIGS. 14 and 15 show partially cut away side views of the heat storage system and the air flow control gate as used in an open loop system with external type heating elements 4.

The heat generating and heat storage part of the heating system is constructed of heating elements and basic blocks or modules shown in FIG. 14 as a vertically disposed series of heat storage slabs arranged horizontally to form blocks. FIG. 14 shows eight slabs in each block. These blocks 1 are disposed vertically one above the other in spaced relation and including external type heating elements between each of the blocks. FIG. 14 shows ten blocks vertically disposed one above the other and nine external type heating elements 4 inserted in the nine air spaces that exist between the stack of ten blocks.

The heat storage blocks 1 and accompanying external type heating elements 4 are enclosed in an insulated heat tank casing 20. The exterior surface of the heat tank casing 20 is insulated with high temperature ceramic wool insulation 21 that is sprayed on the exterior surface of the heat tank casing 20. Heat tank casing 20 is of sufficient dimensions to provide an air space 18 about the exterior of the heat storage blocks 1 and external type heating elements 4.

Enclosing the insulated heat tank casing 20 is an exterior furnace casing 24. The interior of the furnace casing 24 is insulated with low temperature insultion 23. The dimensions of the furnace casing 24 and the insulation 23 are sufficient to allow for an air space 22 to surround the heat tank casing 20 and high temperature insulation 21 on all four sides and the top of the heat tank casing 20. Air space 22 permits low speed cool air to be circulated between the heat tank casing 20 and furnace casing 24.

The external type heating elements 4 penetrate through one wall of the heat tank casing 20, the high temperature insulation 21, low speed air passage 22, low temperature insulation 23 and furnace casing 24 and each heating element 4 is connected to a separate electrical connector 16. Electrical power to be used in heating each of the elements 4 is delivered through each of the connectors 16.

The heat storage block 1, external type heating element 4, and heat tank casing 20 combination rest on a suitable high temperature surface such as ceramic brick.

An extension of the outer furnace casing 24 provides an enclosure in which fan 12, dual-speed fan motor 14, gate control motor 15, cold air filter 25, and split air duct 29 are housed. Cold air filter 25 removes dust and other unwanted particles from the col air being returned to the furnace through cold air duct 26.

A furnace control box 28 is located on the outside of the outer furnace casing 24. This control box 28 encloses all of the electronic controls used in operating the furnace except for capacity selector switch 46 and thermostat 45. These latter controls are located in the building being heated.

Heated air from the furnace is delivered to the building being heated through warm air duct 27. A pair of hot air pressure gates 19 are located in the warm air duct 27. These hot air pressure gates 19 are in a raised position when warm air is being pumped from the furnace through warm air duct 27. However, when warm air is not being pumped through warm air duct 27, these hot air pressure gates drop to a closed position thereby closing the warm air duct 27. These hot air pressure gates 19 help prevent undesired objects being dropped into the interior of the heat tank casing 20.

FIG. 15 shows the split duct 29 and air flow control gate 13 in detail. The control gate 13 is constructed of asbestos, or similar hard surface insulating material, and attached to control gate fitting 32. Control gate 13 and fitting 32 pivot through about 90 degrees about gate pivot 30. The position of control gate 13 is controlled by gate control motor 15. Control gate seal 31 limits the rotation of gate 13 to about 90° and provides an air seal with one edge of gate 13 whenever the gate 13 is in a completely open or closed position.

The constructional material selected for control gate 13 must resist the heat radiated by the heat storage material 1 and heating elements 4. Control gate 13 is shown in FIGS. 14 and 15 in an intermediate position. As can be seen, when the gate 13 is rotated clockwise, the gate 13 shuts down the main air flow passing through header air passage 18 and permits air to pass through low speed air passage 22. When gate 13 is in this position, the fan motor 14 runs at low speed and drives air at low speed through low speed air passage 22 which completely surrounds the heat storage area on al sides except the bottom. This system ensures that most of the heat that is lost through high temperature insulation 21 is not wasted.

When control gate 13 is rotated counter-clockwise, air is permitted to flow through header air passage 18 to the interior of the heat tank enclosed by heat tank casing 20. The air flows past and circulates about the hot heat storage blocks 1 and picks up heat from these heat storage blocks 1. The heated air then exhausts through hot air pressure gates 19 for delivery through warm air duct 27 to the building being heated. It will be seen that when air flow control gate 13 is not in a fully open or closed position, the air that is circulated through low speed air passage 22 and the air that is circulated past heat storage blocks 1 are allowed to mingle with one another as they reach warm air duct 27. By varying the ratio of these two volumes of air, warm air of a specified temperature can be obtained. The ratio of the two volumes of air is controlled by the position of air flow control gate 13. The temperature of the air being delivered through warm air duct 27 and the position of the air flow control gate 13 are sensed and controlled by controls which will be discussed later in this description.

When control gate 13 is in a fully raised position, that is, rotated completely counter-clockwise so that the flow of air to the low speed air passage 22 is completely shut off, all the air pumped by furnace fan 12 passes through header air passage 18 to the interior of the heat tank 9.

The two-speed motor 14 runs at low speed when control gate 13 is in a closed position, that is, rotated as far as possible in a clockwise direction. However, when control gate 13 is adjusted to any other position by gate control motor 15, the two-speed motor 14 runs at high speed. The motor 14 running at high speed drives furnace fan 12 at a high speed thereby maintaining high speed air flow through the heat tank enclosed by heat tank casing 20. A blend of air, one volume of which passes through low speed air passage 22, and the other volume of which passes through header air passages 18, and air passages 17, is used to maintain the exit temperature of the warm air being delivered through warm air duct 27 at about 250° F. The relative proportions of air are controlled by warm air duct sensor 49 acting in co-operation with gate control 48. Gate control 48 operates gate control motor 15 which adjusts control gate 13 to the proper position to obtain a bledn of air of the required temperature. A discussion of these respective controls is presented in more detail later in this description.

Most of the components can be constructed of mild steel. The heat tank casing 20 can be constructed of light weight mild sheet steel and riveted, welded or bolted and insulated with high temperature insulation 21 as a separate prefabricated unit. The outer casing 24 can also be constructed of light weight mild sheet steel covered with the low temperature insulation 23. The slabs and blocks comprising the heat storage material 1 can be packaged and shipped separately to ease handling. The furnace fan 12, control gate 13, two-speed fan motor 14, gate control motor 15 and the compact electronic control box 28 can also be packaged and shipped separately.

The modular design for the respective components of the furnace has been developed so that all sizes and weights will meet shipping regulations, and the largest item will fit through entrance doors the widths of which are specified by local and national building code(s). The heaviest component weight is designed to be less than the weight that two men can lift as specified by local and national labour code(s).

The electrical heating elements in or between the heat storage material 1 of the heat storage cabinet 9 should have sufficient capacity to provide for both heating the building and storing heat during the off-peak hours of electric power supply, the stored heat capacity being determined by cycle of operation. For example, if 180 KWhr is the estimated maximum heat requirement for a 24 hour period and electricity is to be drawn for only 8 hours during the night, the heating elements musth have 180/8 = 22½ KW capacity. 7½ kW are required during the 8 hour period for home heating, representing 60 KWhr, the remaining 15 kW are required for heating the blocks to store 120 kWhr of heat for the 16 hour period when electricity is not being drawn.

It can be seen that the heating system will draw large amounts of power during the night for both direct air heating as required and heat storage block heating, and will deliver the stored heat during the day according to the rate that heat is lost from the house.

Figure 16:
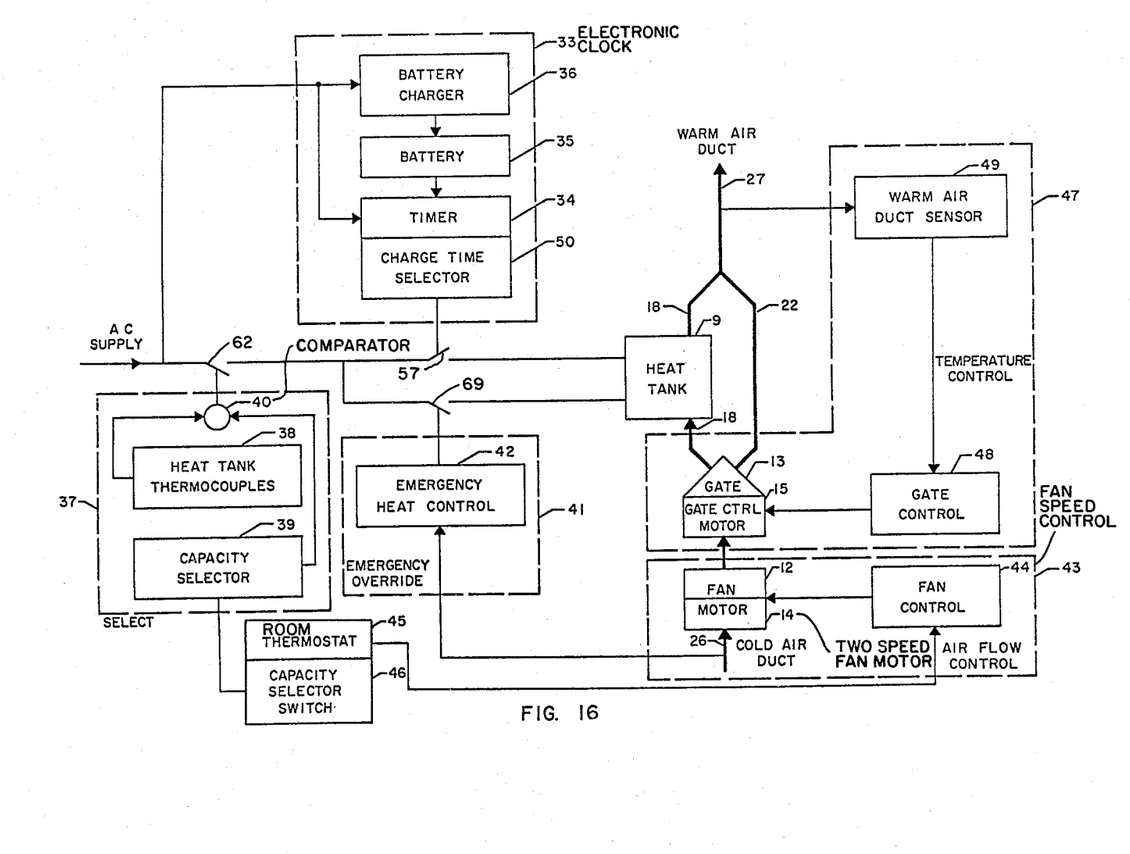
FIG. 16 is a diagrammatic representation of an open loop heating system including controls.

FIG. 16 shows a diagrammetric concept of the open loop heating system and the associated control modules described as units, namely, CLOCK, SELECT, EMERGENCY OVERRIDE, AIR FLOW CONTROL, and TEMPERATURE CONTROL.

The CLOCK unit is an AC or DC supplied electronic clock 33 and electronic timer 34. The clock 33 and the timer 34 serve the function of providing a control signal to supply power to the heat storage material for a predetermined interval every 24 hours. In order to provide continuous operation, even in case of power failure, the clock 33 is powered by a battery 35. The battery is continuously trickle-charged by the battery charger 36 when power is available. The clock 33 and timer 34 circuitry employ integrated circuits to reduce power drain to the point where small, inexpensive, rechargeable batteries can be used.

Digital logic switching is employed to automatically switch from the usual sixty cps power frequency to an onboard cps oscillator/frequency divider. This feature eliminates the need for an electromechanical relay.

The implementation of a variable charge timer (eight, nine or ten hours) by the charge time selector 50 is accomplished by decoding the seven-segment output pulses from the "minutes" digit on a digital alarm clock integrated circuit. One pulse every ten minutes is obtained and is then divided and counted to obtain the correct timer period.

This clock 33 and timer 34 scheme provides higher accuracy than is possible with a resistor-capacitor discharge timer and, more importantly for this application, a much lower power drain than is possible with electromechanical timers.

The SELECT unit is a variable capacity control identified as 37. This capacity control 37 is adjustable and serves to set the maximum energy to be stored in the heat storage material 1 at the choice of the user. This capacity control 37 functions by specifying the maximum heat storage material temperature at which power to the heat storage material 1 is switched off.

The temperature of the heat storage material 1 is sensed by heat tank thermocouples 38. An integrated circuit comparator 40 compares the thermocouple output voltage to a reference voltage set by the capacity selector 39. Once the thermocouple voltage reaches the reference voltage, an output signal from the comparator 40 actuates circuitry to switch off the power to the heat storage material 1. The reference voltage is adjusted by means of a capacity selector switch 46 connected to a resistive voltage divider. This scheme has the advantage of high accuracy, the accuracy being limited only by the accuracy of the thermocouple, and of the reference voltage.

THE EMERGENCY OVERRIDE unit is an emergency timer by-pass control identified as 41. The emergency heat control 42 serves to limit the minimum temperature to which the temperature of the heated space may drop to as a result of power failure during the charging cyele, or other cause of insufficient heat. The emergency override operates at a preset temperature, determined by the fixed component values used in the design. At the present temperature, a fraction of the heating system capacity will be energized independently of the setting of the clock 33 and timer 34.

The emergency heat supply may be activated by either a thermal switch or a thermocouple output compared to a preset voltage. By either of these means, a limited amount of electric heat is supplied to the heated space by-passing the clock 33 and timer 34. This emergency override feature is set to function only when the capacity selector switch 46 is in a heating position (as opposed to "off" or "fan"). This heat supply is limited since a power failure might affect a sizable region and the electrical distribution system would not cope with full electric heating plus peak daytime loads. The electrical power supply by emergency override is sufficient only to insure that freezing temperatures will not occur in the heated spaced under such conditions.

The AIR FLOW CONTROL unit is identified as 43. It consists of a fan control 44 which is actuated by a thermostat 45. The two speed fan motor 14 runs at either low speed or high speed depending upon the signal received from the thermostat 45.

The TEMPERATURE CONTROL unit identified as 47 serves to ensure that the warm air entering the heated spaced through warm air duct 27 is maintained at an acceptable temperature level. The air flow control gate 13 is driven by gate control motor 15 which is energized by the high speed terminal of the two-speed fan motor 14, via gate control 48. Upon energization, the gate 13 starts to open until the temperature of the air emitted from warm air duct 27 is at the desired. level. The gate control motor 15 is shut down by gate control 48. If the air temperature sensed by warm air duct sensor 49 is higher than desired, gate control 48 will reverse the rotation of the gate control motor 15 thereby closing air flow control gate 13 until the outlet thermocouple temperature of the air emitted from warm air duct 27 is at the desired level. Gate control 48 closes gate 13 when fan control 44 switches fan motor 14 from high speed to low speed. Air then flows only through low speed air passage 22 thereby utilizing any casual heat that escapes through insulation 21.

Several block diagrams are disclosed illustrating the operation of the various control modules in detail.

Figure 17:
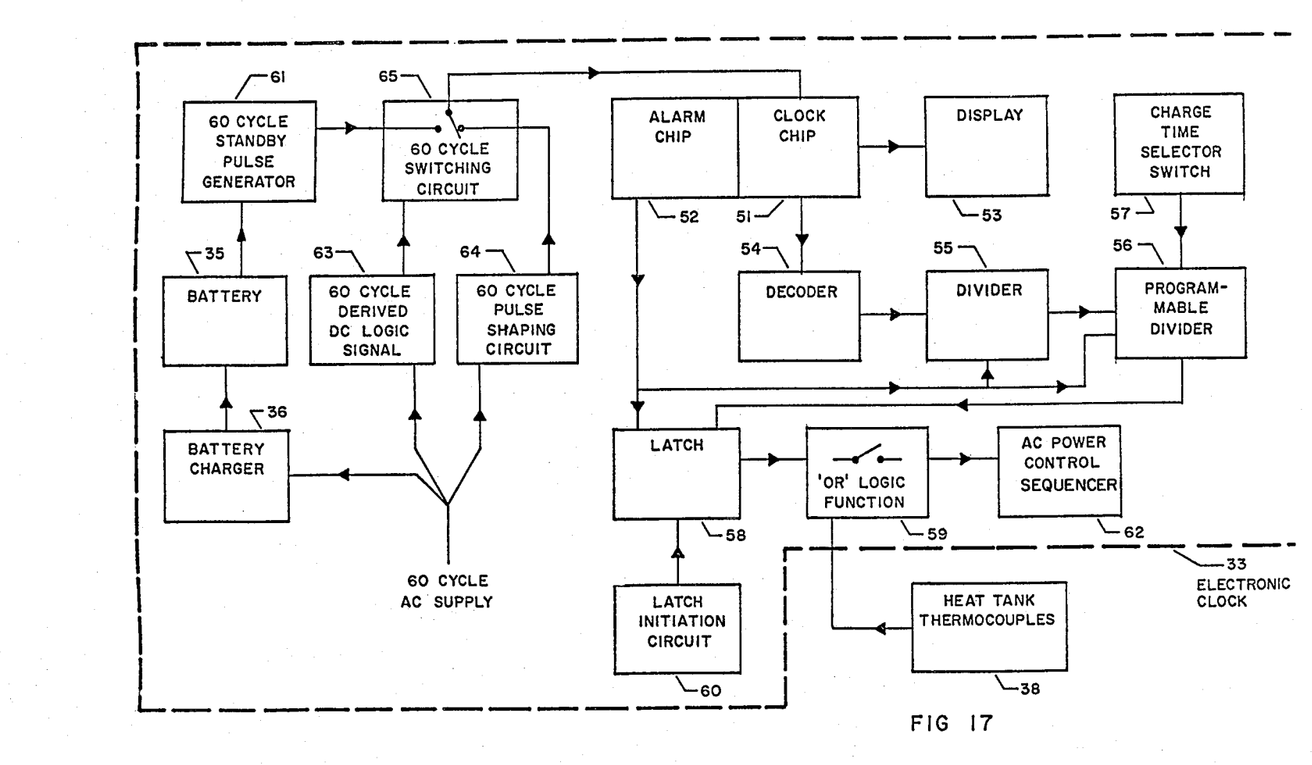
FIG. 17 is a block diagram of the electronic clock control circuit.

FIG. 17 shows a block diagram for the electronic clock 33. Clock chip 51 generates electrical signals to drive display 53. Display 53 consists of seven-segment readouts which give an indication of both the time and the alarm time stored in alarm chip 52. In a specific embodiment, clock chip 51 and alarm chip 52 would most economically be combined into one integrated circuit.

A portion of the seven-segment outputs of clock chip 51 are applied to decorder 54 to produce a train of pulses of a known period. This train of pulses is further divided in frequency by divider 55 to produce a train of pulses of lower frequency. The output of divider 55 is then applied to programmable divider 56. Programmable divider 56 provides one output pulse according to a time interval selected as the charging time of the heat storage furnace. The charging time can be manually selected by charge time selector switch 57. A typical embodiment would allow charge times of either 8, 9 or 10 hours, allowing the same furnace and control system to be used in dewllings of different sizes and heating requirements.

Alarm chip 52 can be programmed to provide an electrical output at a preset time. This preset time corresponds to the time at which the charging cycle of the furnace (heat storage tank 9) is to be initiated. The electrical output of alarm chip 52 is used to set latch 58. The output of alarm chip 52 also resets divider 55 and programmable divider 56. Latch 58, upon receiving the electrical output of alarm chip 52, produces an electrical output until a reset pulse from programmable divider 56 is received. This reset pulse from programmable divider 56 then causes the electrical output of latch 58 to be removed after the selected charge time (i.e. 8, 9 or 10 hours) has elapsed.

Latch initiation circuit 60 resets latch 58 upon initial application of power to the circuit, thus ensuring that, initially latch 58 has no electrical output.

The outputs of latch 58 and heat tank thermocouples 38 are both applied to 'OR' logic function 59. 'OR' logic function 59 provides an electrical output whenever both the latch 58 and heat tank thermocouples 38 indicate that the heat tank 9 should be charged. Heat tank thermocouples 38 produced an electrical output whenever the temperature in the heat tank 9 drops below a preset value. The electrical output of 'OR' logic function 59 is removed whenever latch 58 is reset, indicating the end of a charging cycle, or whenever heat tank thermocouples 38 indicate that the preset heat tank 9 temperature has been reached.

DC power for the circuitry of electronic clock 33 is provided by battery charger 36 and battery 35. When sixty cycle AC power is available, battery charger 36 provides DC power to the circuitry as well as to charging battery 35. When sixty cycle AC power is not available (due to power outages), battery charger 36 does not function and battery 35 supplies power to the circuitry of electronic clock 33.

Timing pulses for clock chip 51 are provided by either sixty cycle pulse shaping circuit 64 or sixty cycle standby pulse generator 61. Sixty cycle switching circuit 65 switches either of these sources of timing pulses to clock chip 51. Sixty cycle switching circuit 65 is controlled by sixty cycle derived DC logic signal 63. Sixty cycle derived DC logic signal 63 produces an electrical output when sixty cycle AC power is present. No electrical output is produced by sixty cycle derived DC logic signal 63 when sixty cycle AC power is not available (due to power outage). The presence of an electrical output from sixty cycle derived DC logic signal 63 causes sixty cycle switching circuit 65 to transfer timing pulses from sixty cycle pulse shaping circuit 64 to clock chip 51 while disconnecting pulses from sixty cycle standby pulse generator 61. The absence of an electrical output from sixty cycle derived DC logic signal 63 causes sixty cycle switching circuit 65 to transfer timing pulses from sixty cycle standby pulse generator 61 to clock chip 51 while disconnecting pulses from sixty cycle pulse shaping circuit 64.

Figure 18:
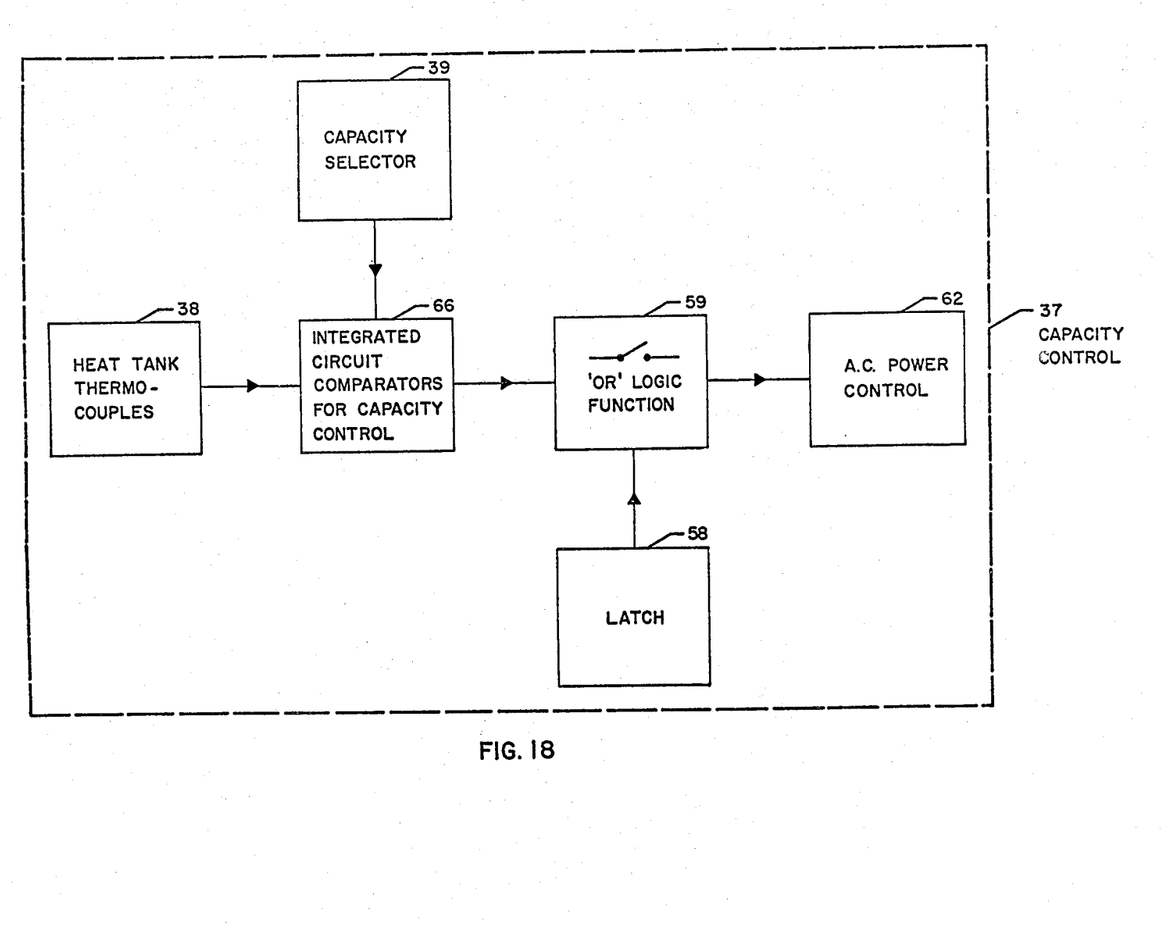
FIG. 18 is a block diagram of the capacity control circuit.

FIG. 18 shows a block diagram for the capacity control 37. Heat tank thermocouples 38 (located in the heat tank) sense the temperature in the heat tank 9 and produce an electrical output which varies with the temperature of the heat tank 9. Integrated circuit comparators for capacity control 66 compare the electrical output generated by heat tank thermocouples 38 with the electrical output generated by capacity selector 39. Capacity selector 39 generates a number of discrete values of electrical output, each value corresponding to a certain heat tank 9 temperature. These discrete values of electrical output are manually selectable by capacity selector switch 46, which is located in an accessible area of the building.

Integrated circuit comparators for capacity control 66 produce an electrical output whenever the electrical output of heat tank thermocouples 38 indicates a heat tank 9 temperature below the preset value corresponding to the output of capacity selector 39. If the heat tank 9 temperature is above the preset value, no electrical output is produced by integrated circuit comparators for capacity control 66.

Latch 58 produces an electrical output during the charge cycle time as controlled by electronic clock 33. The outputs of latch 58 and integrated circuit comparators for capacity control 66 are both applied to 'OR' logic function 59. 'OR' logic function 59 provides an electrical output whenever both the latch 58 and integrated circuit comparators for capacity control 66 indicate that the heat tank 9 should be charged. The electrical output of 'OR' logic function 59 is removed whenever latch 58 is reset, indicating the end of a charging cycle, or whenever integrated circuit comparators for capacity control 66 indicate that the preset heat tank 9 temperature has been reached.

'OR' logic function 59 drives AC power control 62. AC power control 62 is designed to apply power to the heat tank heating elements in sequence so that full load is not applied to all of the heat tank heating elements at the same time. AC power control 62 staggers the times at which the individual heating elements are switched on, thereby ensuring that a large surge is not drawn from the power line.

Figure 19:
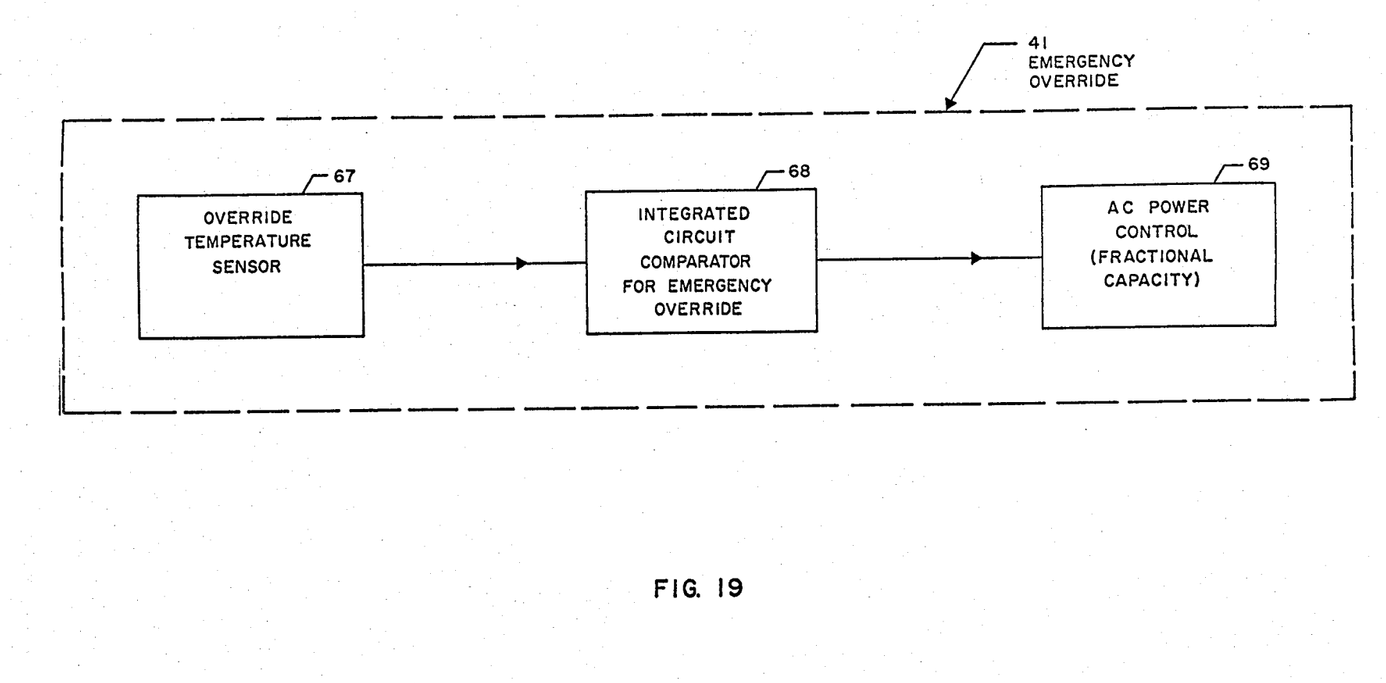
FIG. 19 is a block diagram of the emergency override circuit.

FIG. 19 shows a block diagram for the emergency override 41. Override temperature sensor 67 senses the temperature of the air in the cold air return duct 26 of the furnace. The electrical output of override temperature sensor 67 is applied to integrated circuit comparator for emergency override 68. If the air temperature in the cold air return duct 26 drops below a designated value, integrated circuit comparator for emergency override 68 produces an electrical output. This electrical output is applied to AC power control (fractional capacity) 69. AC power control (fractional capacity) 69 is designated to apply power to only a fraction of the total number of heating coils 7 in the heat tank 9.

It will be appreciated that the foregoing description is directed to a preferred embodiment of the invention and that various technical non-inventive modifications and variations can be made to the invention to adapt the invention to various uses. It is to be understood, therefore, that such modifications and variations fall within the spirit and scope of the invention and the following claims to the invention.

We claim:
1. An electrical heating unit comprising:

a mass of solid heat storage material for storing heat generated electrically during off-peak electrical power periods;

means associated with the mass of solid heat storage material for electrically generating heat for storage in the heat storage material;

a casing having an outer jacket and an inner jacket with an air space therebetween, the heat storage material being enclosed in the inner jacket;

means associated with the solid mass of heat storage material for withdrawing heat stored in the mass of solid heat storage material, said heat withdrawing means including an air inlet passage communicating with the air space between the inner and outer jackets and with the interior of the inner jacket; and an air outlet passage communicating with the space between said inner and outer jackets with the interior of said inner jacket;

a two-speed fan disposed to draw air into said air inlet passage;

an air flow control gate in one of said air passages, the air flow control gate being movable to select the path of air flowing from said inlet air passage to said outlet air passage, control means for moving said gate to selectively direct the air driven by the fan in one of three manners including (1) only through the air space between the two jackets, (2) only through the interior of the inner jacket thereby causing the air to pick up heat directly from the mass of solid heat storage material and (3) in two parts with one part being directed through the air space between the two jackets the other part being directed through the interior of the inner jacket, the two air parts being subsequently blended together in said air outlet passage for delivery to a space to be heated; and means for controlling operation of the fan between its two speeds, said fan control means being responsive to the position of said air flow control gate and operating said fan on the lower of its two speeds when the air flow control gate is set to allow air flow only through the air space between the jackets and operating the fan on the higher of its two speeds when the air flow control gate is set to allow air flow other than only through the air space between the jackets.

2. The heating unit of claim 1 wherein the heat storage material comprises at least one solid block disposed in said inner jacket.

3. The heating unit of claim 1 wherein an electrical heating element is used as the means for generating heat in the solid mass of heat storage material and the element is at least partially imbedded in the solid mass of heat storage material.

4. The heating unit of claim 1 wherein the surface of the solid mass of heat storage material is sealed with a suitable sealant to retard the transmission of vapours into and out of the solid mass of heat storage material.

5. The heating unit of claim 1 wherein the duration of transmission of electrical power to the means for electrically generating heat for storage in the solid mass of heat storage material is controlled by a rechargeable battery fed electronic clock and a selective variable time delay electronic timer.

6. The heating unit of claim 1 wherein the control means for said air flow control gate includes means responsive to the temperature of the blended air parts being delivered to the space to be heated.

7. The heating unit of claim 6 wherein the outer jacket of the casing is insulated with low temperature insulation.

8. The heating unit of claim 6 wherein the inner jacket of the casing is insulated with high temperature insulation.

9. The heating unit of claim 1 wherein the outer jacket of the casing is insulated with low temperature insulation.

10. The heating unit of claim 9 wherein the inner jacket of the casing is insulated with high temperature insulation.

11. The heating unit of claim 1 wherein the mass of solid heat storage material comprises a sale selected from the group consisting of $Na_2SO_4$, $NaCl$, $KCl$ and $CaCl_2$, and mixtures thereof with an inorganic binding agent.

* * * * *